United States Patent [19]

Jankovic

[11] Patent Number: 5,634,621

[45] Date of Patent: Jun. 3, 1997

[54] THREE-STAGE DUAL CUP HOLDER

[75] Inventor: Tomislav Jankovic, Etobicoke, Canada

[73] Assignee: Manchester Plastics, Inc., Troy, Mich.

[21] Appl. No.: 477,162

[22] Filed: Jun. 7, 1995

[51] Int. Cl.[6] .................................................. A47K 1/08
[52] U.S. Cl. .................. 248/311.2; 224/926; 297/188.17
[58] Field of Search ................................ 248/311.2, 310, 248/314, 316.8; 224/926; 297/188.16, 188.17

[56] References Cited

U.S. PATENT DOCUMENTS

| | | | |
|---|---|---|---|
| 4,943,111 | 7/1990 | VanderLaan | 248/311.2 X |
| 4,984,722 | 1/1991 | Moore | 224/926 X |
| 5,141,194 | 8/1992 | Burgess et al. | 248/311.2 |
| 5,379,978 | 1/1995 | Patel et al. | 224/926 X |
| 5,505,516 | 4/1996 | Spykerman et al. | 248/311.2 |
| 5,511,755 | 4/1996 | Spykerman | 224/926 X |

*Primary Examiner*—Ramon O. Ramirez
*Attorney, Agent, or Firm*—Bliss McGlynn, P.C.

[57] ABSTRACT

A cup holder apparatus (10) is moveable between various vertical heights and width dimensions to selectively receive beverage containers (12) of different sizes. The apparatus (10) includes a housing (14) having a cavity (24) with a base (16) support therein and a gap formed therebetween. A pair of opposing support members (26) are positioned within the gap in the stowed position and are moved vertically upwardly and horizontally outwardly through at least two positions of different height and horizontal spacing.

12 Claims, 2 Drawing Sheets

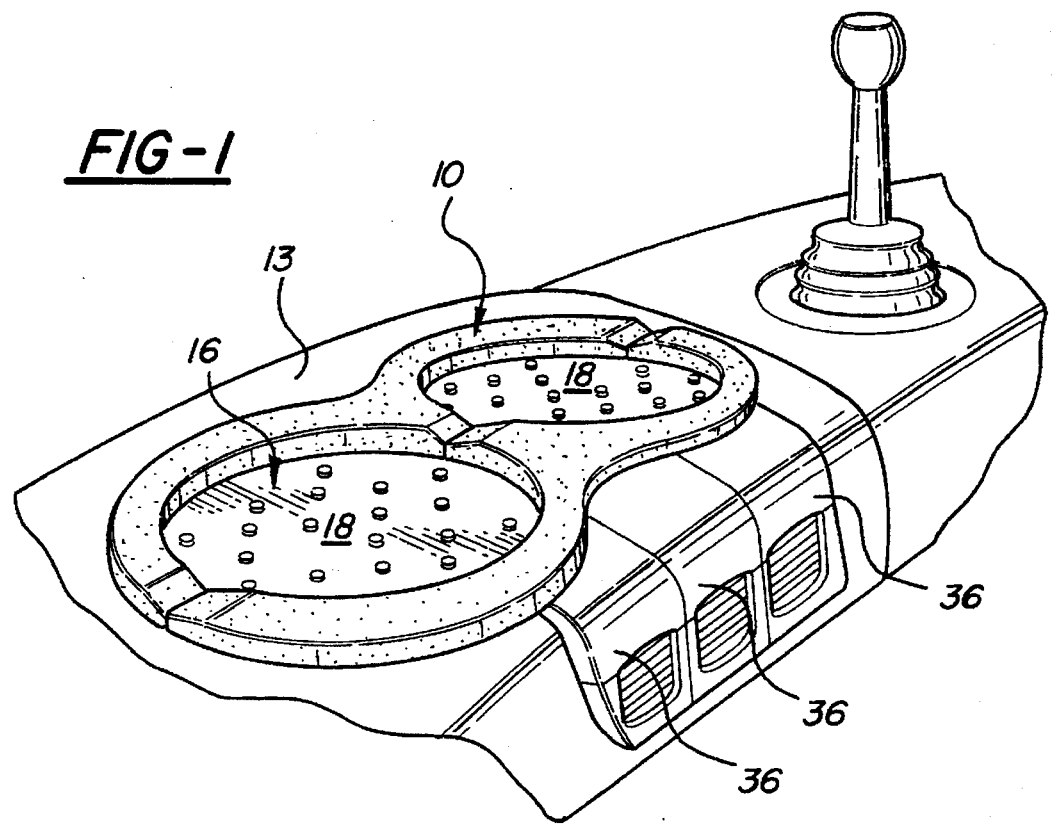
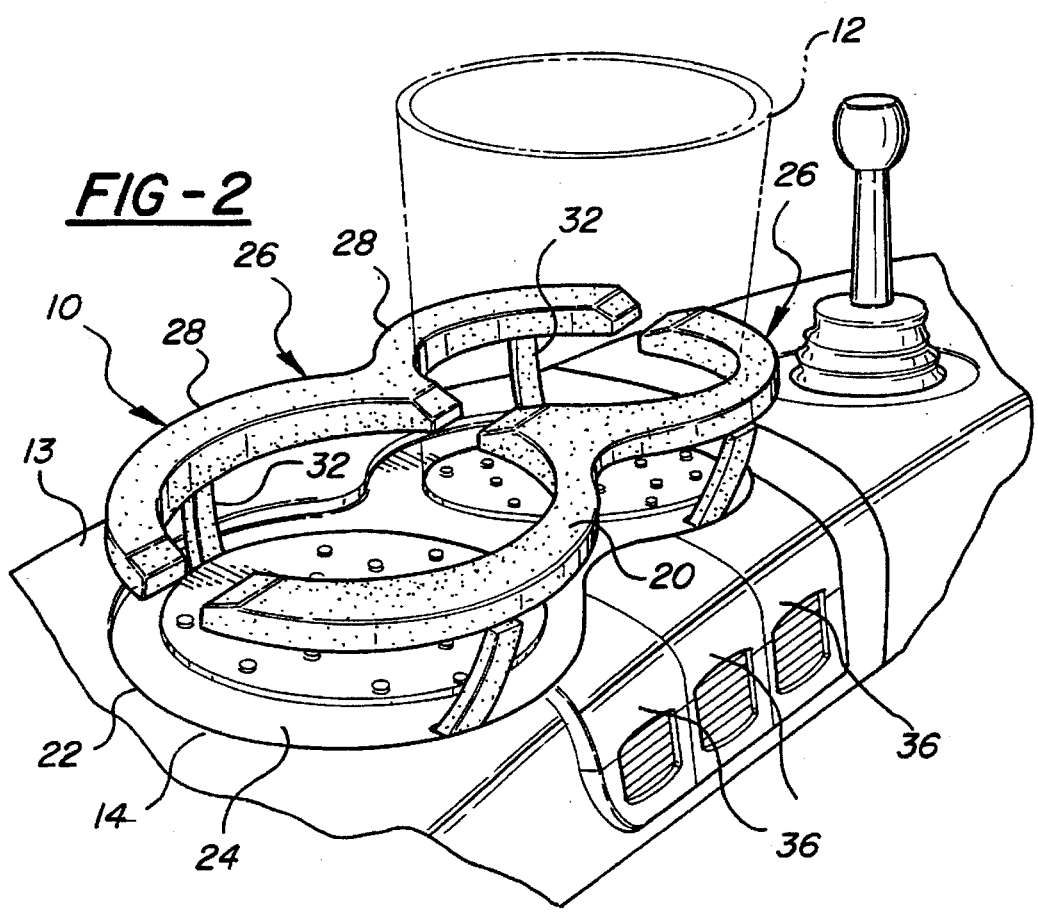

5,634,621

THREE-STAGE DUAL CUP HOLDER

TECHNICAL FIELD

The invention relates to container holders or cup holders for vehicles, and more particularly toward cup holders capable of holding beverage containers of different sizes.

BACKGROUND OF THE INVENTION

It is common in vehicles to include cup holders or container holders for supporting cups, cans, or other beverage containers in a vehicle. There are several single sized cup holders available which hold only a single sized container, along with variable sized container holders for allowing containers of varied dimensions. Such a variable dimension cup holder is illustrated in U.S. Pat. No. 4,943,111, issued Jul. 24, 1990, in the name of VanderLaan. The patent discloses a container holder which is stored in an armrest and pivoted to its use position. A container support slides relative to another side such that facing surfaces can engage opposite sides of different diameter containers.

There are also know to be cup holders which vertically extend and retract to support a container. Representative of such cup holders is U.S. Pat. No. 5,141,194 issued Aug. 25, 1992, in the name of Burgess, et al. The patent discloses a retractable container holder which is stored in an upright, flat pocket and has four hinged plates which open into an inverted triangle shape, the top of which has apertures for receiving containers in the sides of plates which are also apertured to allow container to stand on a flat base.

It is desirable to include a cup holder design which can accommodate different sized containers and extend upright from a horizontal surface.

SUMMARY OF THE INVENTION

The invention is a cup holder apparatus for supporting a container. The apparatus comprises a housing; a base plate secured with the housing; at least two side support members spaced from one another and supported with the housing, the side support members extending upwardly from the base plate to support sides of a container; and a control assembly connected with the housing and the side support members for controlling the side support members between at least a first position having a first vertical height above the base and a first spacing distance between the side support members, and a second position having a second vertical height greater than the first vertical height, and a second spacing distance greater than said first spacing distance.

BRIEF DESCRIPTION OF THE DRAWINGS

The advantages of the invention will become readily appreciated as the same becomes better understood by reference to the following detailed description when considered in connection with the accompanying drawings wherein:

FIG. 1 is a perspective view of the subject invention in the stowed position;

FIG. 2 is a perspective view illustrating the subject invention in a use position.

DETAILED DESCRIPTION OF THE INVENTION

Figure 3A:
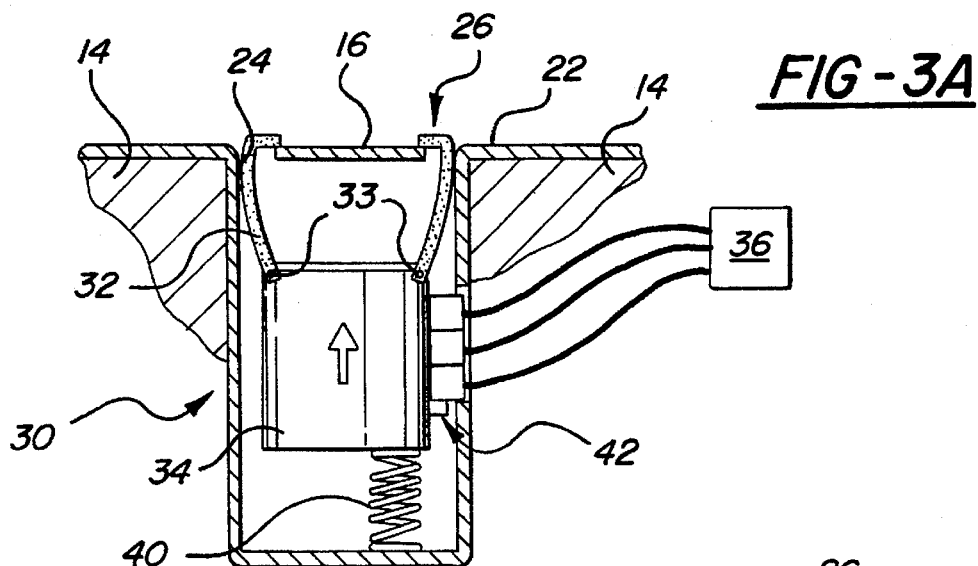
FIG. 3A, 3B, and 3C are schematic views illustrating the multiple positions of the subject invention.

A cup holder apparatus 10 is generally illustrated in FIGS. 1 and 2. The cup holder apparatus 10 allows for various dimensions of containers 12 to be supported in the cup holder apparatus 10 in the use position of FIG. 2. The cup holder apparatus 10 is illustrated as used in a console 13 of a vehicle, and may be alternatively be used in other portions of a vehicle, such as an instrument panel, arm rest, etc. Any type of container 12 may be used herein, i.e., cup, bottle etc.

The container holder apparatus 10 includes a support housing 14 which is secured to a vehicle at a selected location. The support housing 14 includes a cup holder base plate 16 secured thereto in a fixed position. In the preferred embodiment, the cup holder apparatus 10 illustrates a dual cup holder to hold up to two containers 12 therein. However, it is appreciated that various numbers of containers 12 may be held by the apparatus 10 as taught by the teachings of the invention.

In the preferred embodiment, the base plate 16 is generally comprised of two circular portions 18 connected to one another by a web 20 to support the bottom of a container 12. In general, the base plate 16 is horizontally located and supported by the housing 14 to support the containers 12. The support housing 14 provides an upper surface 22 with a cavity 24 formed therein. The periphery of the cavity 24 is formed of a similar shape to the base plate 16, and slightly enlarged therefrom, as subsequently discussed. The base plate 16 is slightly recessed within the cavity 24 below the upper surface 22. The surface of the base plate 16 may include a roughened surface or bumps 17 thereon to prevent a container 12 from sliding on the surface of the base plate 16. The pattern of bumps is designed to securely receive containers of different sized bottoms.

The cup holder apparatus 10 includes at least two opposing side support members 26 spaced across the base plate 16 from one another. The side support members 26 are set within the cavity 24 level with the upper surface 22 of the housing 14, and adjacent the base plate 16 in the stowed position. In this stowed position (X position), the upper surface 22 and the side support members 26 are generally level with one another with the base plate 16 slightly recessed therefrom. The base plate 16 is positioned between the opposing side support members 26. The side support members 26 each include a pair of semi-circular portions 28 connected to one another at longitudinal ends thereof. Each of the semi-circular portions 28 mates with or compliments the circular portions 18 of the base plate 16 and generally outline the shape or contour thereof. The side support members 26 include a horizontal width acting as a rim to support the beverage containers 12.

The side support members 26 are extended vertically with respect to the base plate 16 and upwardly from the upper surface 22 in the use position. The side support members 26 are able to be moved between at least two positions. A first extended position Y causes the side support members 26 to have a first vertical height above the base plate 16 and a first spacing distance from one another. A second extended position Z causes the side support members 26 to be raised to a second vertical position greater than the first vertical position and to be horizontally spaced further from one another to a second spacing having a distance greater than the first spacing distance. This allows the different sized containers 12 to be selectively supported in the cup holder apparatus 10.

Figure 3B:
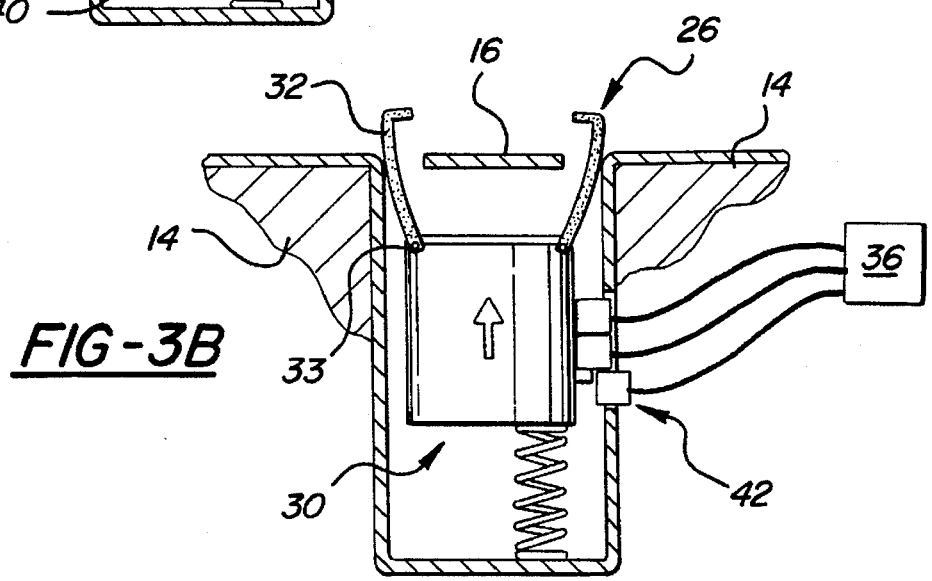
Figure 3C:
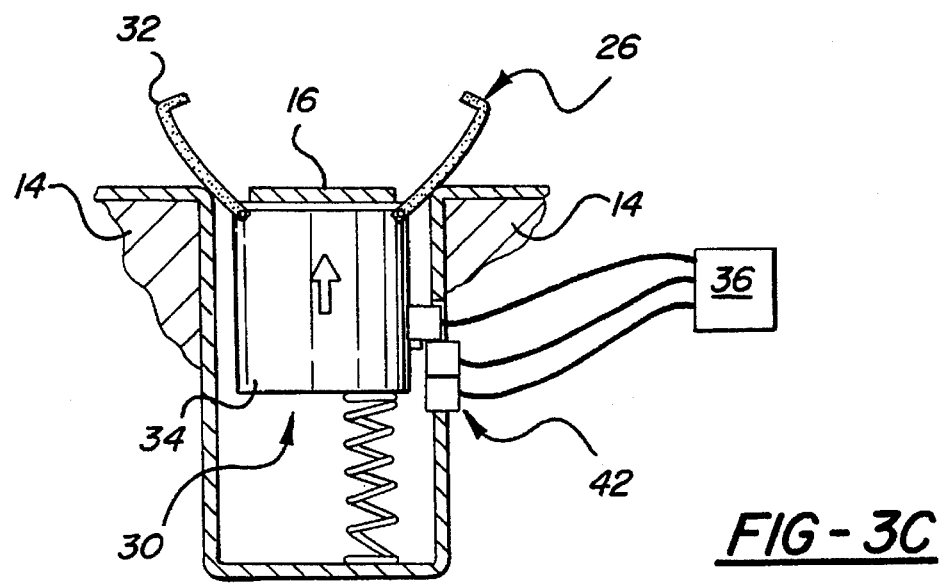

The cup holder apparatus 10 includes a control assembly 30 connected with the housing 14 and cavity 24, and to the side support members 26 for controlling movement of the side support members 26 between the stowed and use positions, or the multiple positions thereof. The control assembly 30 includes an arm 32 extending to the center arcuate portion of each semi-circular portion 28. In other words, four arms 32 extend substantially vertically upwardly to support the side support members 26, i.e., two arms 32 per member 26. The arms 32 as best illustrated in FIG. 3 comprise a generally straight shaft connected to the semi-circular arcuate portion 28. The side support members 26 extend horizontally inwardly from the connection point of the arms 32 to support the container 12. The arm 32 and semi-circular portion 28 are generally perpendicular to one another. However, it can be appreciated that such angular dimension may vary as depending on the design.

The arms 32 may be pivotally connected by pivot pins 33 to a vertically movable guide member 34 to control such arms 32 to move both vertically and horizontally outwardly between at least three different positions. The guide member 34 moves vertically between three positions X, Y and Z in the preferred embodiment. As the guide member 34 moves upwardly, the arms 32 are forced vertically upwardly and horizontally outwardly through the gap 25 formed between the base 16 and housing 14. As illustrated in FIG. 3, a lower most position X includes the arms 32 spaced close therewith. The highest most or second extended position Z includes the arms 32 spaced a greater distance apart and also vertically higher than the other positions. The arms 32 and guide track 34 may be biased by a spring 40 to the use position in the most extended position Z such that to move same to the stowed position requires the user to press the side support members 26 back to and against the base plate 16 and housing 14 wherein a latch 42 maintains the support members 26 level against the housing 14 in the stowed position.

The control assembly 30 may also include a plurality of buttons 36 externally accessible on the vehicle to the user, each representing one of the positions of multiple positions X, Y, and Z of the cup holder apparatus 10. Each of the buttons 36 may be actuated to move the side support members 26 to either the first X, second Y, or third Z positions, respectively. The buttons 36 will cause release of the latch 42 and will limit its upward vertical movement to the selected position X, Y, Z by suitable detents.

The invention has been described in an illustrated manner, and it is to be understood that the terminology which has been used is intended to be in the nature of words of description rather than of limitation.

Many modifications and variations of the present invention are possible in light of the above teachings. It is therefore to be understood that within the scope of the appended claims, the invention may be practiced otherwise than as specifically described.

What is claimed is:

1. A cup holder apparatus for supporting a container comprising:
   a housing;
   a base plate operatively secured with said housing;
   at least two side support members spaced from one another and supported with said housing, said side support members extending upwardly from said base plate to support sides of a container; and
   a control assembly connected with said housing and at least one of said side support members for selectively controlling and retaining said side support member in a first container supporting position having a first vertical height above said base and a first spacing distance between said side support members, and a second container supporting position having a second vertical height greater than said first vertical height and a second spacing distance greater than said first spacing distance.

2. An apparatus as set forth in claim 1 wherein said base plate comprises two circular portions connected to one another by a web portion for supporting a container.

3. An apparatus as set forth in claim 2 wherein said at least two side support members each comprise two arcuate portions connected to one another having a configuration complimenting said base plate and extending between said base plate and said housing.

4. An apparatus as set forth in claim 3 wherein said housing includes a cavity extending therein for receiving said base plate with a gap formed between said base plate and said housing for receiving said at least one of said side support members therein.

5. An apparatus as set forth in claim 1 wherein said control assembly includes a plurality of guide arms connected to at least one of said support members for moving said side support member vertically above said housing and horizontally outwardly from one another.

6. An apparatus as set forth in claim 5 wherein said control assembly includes a plurality of selected buttons for allowing selections to either of said first positions or said second positions, respectively.

7. An apparatus as set forth in claim 1 wherein said housing includes a cavity extending therein for receiving said base plate.

8. An apparatus as set forth in claim 7 wherein said base plate is moveably connected to said housing to allow said base plate to move vertically in said cavity.

9. An apparatus as set forth in claim 1 wherein said control assembly is connected to said at least two side support members.

10. A cup holder apparatus for supporting a container comprising:
    a housing;
    a base plate operatively secured with said housing;
    at least two side support members spaced from one another and supported with said housing, said side support members extending upwardly from said base plate to support sides of a container; and
    a control assembly connected with said housing and said side support members for selectively controlling and retaining said side support members to a first container supporting position having a first vertical height above said base and a first spacing distance between said side support members, and a second container supporting position having a second vertical height greater than the said first vertical height and a second spacing distance greater than said first spacing distance, the spacing distance being dependent upon the vertical height.

11. A cup holder apparatus for supporting a container comprising:
    a housing;
    a base plate operatively secured with said housing;
    at least two side support members spaced from one another and supported with said housing, said side support members extending upwardly from said base plate to support sides of a container;
    a control assembly connected with said housing and said side support members for controlling at least one said side support members between a first container supporting position having a first vertical height above said base and a first spacing distance between said side support members, and a second container supporting position having a second vertical height greater than the said first vertical height and a second spacing distance greater than said first spacing distance; and
    said housing including a cavity extending therein for receiving said base plate with a gap formed between said base plate and said housing for receiving at least one of said side support members therein.

12. A cup holder apparatus for supporting a container comprising:

a housing;

a base plate operatively secured with said housing;

at least two side support members spaced from one another and supported with said housing, said side support members extending upwardly from said base plate to support sides of a container;

a control assembly connected with said housing and said side support members for controlling at least one said side support members between a first container supporting position having a first vertical height above said base and a first spacing distance between said side support members, and a second container supporting position having a second vertical height greater than the said first vertical height and a second spacing distance greater than said first spacing distance; and said control assembly including at least one guide arm connected to said at least one support member for moving vertically above said housing and horizontally outwardly from the other of said support member.

* * * * *